(12) United States Patent
Seyed Jamali et al.

(10) Patent No.: US 10,982,107 B2
(45) Date of Patent: *Apr. 20, 2021

(54) METAL NANOPARTICLE INK COMPOSITION

(71) Applicant: XEROX CORPORATION, Norwalk, CT (US)

(72) Inventors: Hojjat Seyed Jamali, Mississauga (CA); Adela Goredema, Ancaster (CA); Biby Esther Abraham, Mississauga (CA); Jonathan Lee, Oakville (CA); Cuong Vong, Hamilton (CA)

(73) Assignee: XEROX CORPORATION, Norwalk, CT (US)

( * ) Notice: Subject to any disclaimer, the term of this patent is extended or adjusted under 35 U.S.C. 154(b) by 291 days.

This patent is subject to a terminal disclaimer.

(21) Appl. No.: 16/043,598

(22) Filed: Jul. 24, 2018

(65) Prior Publication Data

US 2020/0032088 A1    Jan. 30, 2020

(51) Int. Cl.

| | |
|---|---|
| *C09D 11/38* | (2014.01) |
| *C09D 11/52* | (2014.01) |
| *B22F 1/00* | (2006.01) |
| *B82Y 40/00* | (2011.01) |
| *B82Y 30/00* | (2011.01) |

(52) U.S. Cl.
CPC ............ *C09D 11/38* (2013.01); *B22F 1/0018* (2013.01); *B22F 1/0074* (2013.01); *C09D 11/52* (2013.01); *B22F 2301/052* (2013.01); *B22F 2301/255* (2013.01); *B22F 2301/30* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | |
|---|---|---|
| 7,270,694 B2 | 9/2007 | Li et al. |
| 7,494,608 B2 | 2/2009 | Li et al. |

(Continued)

OTHER PUBLICATIONS

Author Unknown, "1-Phenyl-1-cyclohexene 95%," Sigma-Alrich, https://www.sigmaaldrich.com/catalog/product/aldrich/p22303?lang=en&region=US, downloaded Feb. 20, 2018, 3 pgs.

(Continued)

*Primary Examiner* — Helene Klemanski
(74) *Attorney, Agent, or Firm* — MH2 Technology Law Group LLP (57) ABSTRACT

A metal nanoparticle ink composition comprises an ink vehicle and a plurality of metal nanoparticles dispersed in the ink vehicle. The metal nanoparticles including both a first organic stabilizing group and a second organic stabilizing group attached thereto, the first organic stabilizing group being different from the second organic stabilizing group, the first organic stabilizing group being selected from the group consisting of decylamine, undecylamine, dodecylamine, tridecylamine, tetradecylamine and mixtures thereof, and the second organic stabilizing group being selected from group consisting of butylamine, pentylamine, hexylamine, heptylamine, octylamine, nonylamine, decylamine and mixtures thereof.

18 Claims, 2 Drawing Sheets

(56) References Cited

U.S. PATENT DOCUMENTS

| | | | |
|---|---|---|---|
| 8,765,025 B2* | 7/2014 | Wu | C09D 7/62 252/514 |
| 9,422,443 B2 | 8/2016 | Iguchi et al. | |
| 9,725,614 B2 | 8/2017 | Liu et al. | |
| 9,758,689 B2* | 9/2017 | Wu | C09D 11/36 |
| 9,776,250 B2 | 10/2017 | Iguchi et al. | |
| 10,214,655 B2* | 2/2019 | Liu | C09D 11/033 |
| 2008/0032047 A1* | 2/2008 | Parashar | H01B 1/02 427/372.2 |
| 2009/0214764 A1* | 8/2009 | Li | B82Y 30/00 427/98.4 |
| 2010/0233361 A1* | 9/2010 | Hu | B82Y 30/00 427/125 |
| 2011/0232527 A1* | 9/2011 | Kang | C09D 11/36 106/31.75 |
| 2013/0334470 A1* | 12/2013 | Kurihara | C22C 5/06 252/514 |
| 2014/0312284 A1 | 10/2014 | Liu et al. | |
| 2016/0326337 A1 | 11/2016 | Farrugia et al. | |
| 2017/0240758 A1 | 8/2017 | Liu et al. | |
| 2017/0253757 A1 | 9/2017 | Salami et al. | |
| 2017/0298246 A1 | 10/2017 | Liu et al. | |
| 2020/0031041 A1* | 1/2020 | Goredema | H05K 3/10 |
| 2020/0032092 A1* | 1/2020 | Seyed Jamali | B22F 1/0022 |

OTHER PUBLICATIONS

Author Unknown, "Phenylcyclohexane≥97%," Sigma-Alrich, https://www.sigmaaldrich.com/catalog/product/aldrich/c104809?lang=en&region=US&cm . . . , downloaded Feb. 20, 2018, 3 pgs.

Author Unknown, "Xerox Silver Nanoparticle Piezo Inkjet Ink Product Code: xcm-nsIJ," product information sheet 2015, 1 pg.

Author Unknown, "Xerox Silver Nanoparticle Flexographic Ink Product Code: xcm-nxFLX," product information sheet, 2015, 1 pg.

Author Unknown, "Xerox Silver Nanoparticle Pneumatic Aerosol Jet Ink Product Code: xcm-nsPA," product information sheet, 2015, 1 pg.

Author Unknown, "Xerox Silver Nanoparticle Ultrasonic Aerosol Jet Ink Product Code: xcm-nsUA," product information sheet, 2015, 1 pg.

Author Unknown, "Silver Nanoparticle & Silver Ink," Xerox Research Centre of Canada, products information sheet, http://xrcc.external.xerox.com/electronic-materials.html, downloaded Mar. 2, 2018, 3 pgs.

* cited by examiner

FIG. 1

| | >90% Jetting |
|---|---|
| > 14 Nozzles | |
| >60% Jetting | |
| > 10 and <14 Nozzles | |
| 0% Jetting | |
| None | |

| Ink sample | 3 min | 5 min | 10 min | 20 min | 30 min | 1 hour | 1.5 hour | 2 hour | 2.5 hour | 3.0 hour |
|---|---|---|---|---|---|---|---|---|---|---|
| Ink of Comparative Example 2B | | | | | | | | | | |
| Ink of Example 2A | | | | | | | | | | |

FIG. 2

METAL NANOPARTICLE INK COMPOSITION

DETAILED DESCRIPTION

Field of the Disclosure

The present disclosure is directed to metal nanoparticle ink compositions.

Background

Solution processable conducting materials that include metal nanoparticles play an important role in the electronic industry in general. Solution processable metal nanoparticles can be used to fabricate various conducting features in electronic devices (whether 3D printed or made by other processing techniques), such as electrodes and electrical interconnectors, by low-cost solution deposition and patterning techniques. The metal nanoparticles and other materials used to form the conductive features can be chosen to provide sufficient conductivity to enable proper operations for the electronic devices fabricated.

Metal nanoparticles are known to be dispersed in liquid solution to form inks that can be deposited onto a desired substrate to form conductive metal features. For example, the compositions can be printed onto the substrate using an inkjet printer, pneumatic aerosol printer or any other suitable printer and then annealed at low temperatures to form the conductive features.

One of the challenges for metal nanoparticle inkjet inks is that the inks exhibit relatively poor in-printhead stability evidenced by short latency times. More specifically, when an inkjet printer, such as a Dimatix printer, is idle over time, such as for several minutes and longer, all or a portion of the nozzles or jets may cease to fire. Some jets or nozzles may be recovered by executing a purge cycle, but this is wasteful and, in the case of precious metal inks, can be costly. Therefore, there is a need to develop silver nanoparticle inks with a more stabilized in-printhead performance that can then be widely used with inkjet technology for electronic device applications.

With the rise of the internet of things (IOT), conductive 3D printed objects can find many applications in creating smart components for automotive and rail, aerospace, military, home appliances and many other applications. These smart structures can be built by the incorporation of functional elements such as conductive tracks and electronics into 3D printed structures. Many 3D printed structures are manufactured from polymeric materials that can melt when exposed to relatively low temperatures. In order to fabricate 3D printed structural electronics, highly conductive materials that are compatible with structural materials used in 3D printing would be beneficial. Most available conductive inks that employ metal-containing nanoparticles need to be annealed at very high temperatures which can lead to the melting/softening of low melting or low glass transition temperature, polymeric structures, including those made by 3D printing methods.

Nanoparticles are available that can be annealed at relatively low temperatures. One such nanoparticle is synthesized by reducing a silver salt and then including a stabilizing binder made from dodecylamine around the resulting particles.

It would be considered an advancement in the art to develop a novel metal nanoparticle ink composition with improved in-printhead stability. There is also a need to develop conductive inks that anneal at lower temperature to enable fabrication of conductive objects using low temperature substrates, such as objects made by 3D printing techniques.

SUMMARY

An embodiment of the present disclosure is directed to a metal nanoparticle ink composition. The ink composition is made by mixing ingredients comprising: a first solvent being nonpolar and having a boiling point above 160° C. at 1 atmosphere pressure; a second solvent having a boiling point above 230° C. at 1 atmosphere pressure, the second organic solvent being an aromatic hydrocarbon and having a higher boiling point than the first hydrocarbon solvent; and a plurality of metal nanoparticles.

Another embodiment of the present disclosure is directed to a method. The method comprises providing a metal nanoparticle ink composition made by mixing ingredients comprising (a) a first organic solvent with a boiling point above 160° C. at 1 atmosphere pressure; (b) a second organic solvent with a boiling point above 230° C. at 1 atmosphere pressure, the second organic solvent having a higher boiling point than the first organic solvent; and (c) a plurality of metal nanoparticles. The ink composition is printed onto a substrate.

Another embodiment of the present disclosure is directed to a metal nanoparticle ink composition. The metal nanoparticle ink composition comprises an ink vehicle and a plurality of metal nanoparticles dispersed in the ink vehicle, the metal nanoparticles including both a first organic stabilizing group and a second organic stabilizing group attached thereto, the first organic stabilizing group being different from the second organic stabilizing group, the first organic stabilizing group being selected from the group consisting of decylamine, undecylamine, dodecylamine, tridecylamine, tetradecylamine and mixtures thereof, and the second organic stabilizing group being selected from group consisting of butylamine, pentylamine, hexylamine, heptylamine, octylamine, nonylamine and decylamine.

Another embodiment of the present disclosure is directed to a method of printing a metal nanoparticle ink composition. The method comprises selectively depositing a metal nanoparticle ink composition on a substrate to form a printed ink pattern. The metal nanoparticle ink composition comprises an ink vehicle and a plurality of metal nanoparticles dispersed in the ink vehicle. The metal nanoparticles including both a first organic stabilizing group and a second organic stabilizing group attached thereto, the first organic stabilizing group being different from the second organic stabilizing group, the first organic stabilizing group being selected from the group consisting of decylamine, undecylamine, dodecylamine, tridecylamine, tetradecylamine and mixtures thereof, and the second organic stabilizing group being selected from group consisting of butylamine, pentylamine, hexylamine, heptylamine, octylamine, nonylamine, decylamine and mixtures thereof. The printed ink pattern is heated to an annealing temperature and the annealing temperature is maintained for an anneal time sufficient to form a desired conductive metal pattern on the substrate.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

DESCRIPTION OF EMBODIMENTS

Metal Nanoparticle Compositions

Embodiments of the present disclosure are directed to a metal nanoparticle ink composition. In an embodiment, the metal nanoparticle ink composition comprises an ink vehicle and a plurality of metal nanoparticles dispersed in the ink vehicle. The metal nanoparticles including both a first organic stabilizing group and a second organic stabilizing group attached thereto. The alkyl moiety of the first organic stabilizing group has a longer carbon chain length than the alkyl moiety of the second organic stabilizing group. As will be discussed in greater detail below, the first organic stabilizing group can be selected from the group consisting of decylamine, undecylamine, dodecylamine, tridecylamine, tetradecylamine and mixtures thereof. The second organic stabilizing group can be selected from group consisting of butylamine, pentylamine, hexylamine, heptylamine, octylamine, nonylamine, decylamine and mixtures thereof.

By employing organic stabilizers having at least two different carbon chain lengths, one or more benefits can be achieved, such the ability to form relatively small nanoparticles and/or relatively low annealing temperatures for conductive inks made by the particles, as will be discussed in greater detail herein.

Metal Nanoparticles

The term "nano" as used in "metal nanoparticles" refers to, for example, a particle size of 100 nm or less, such as, for example, from about 0.5 nm to about 100 nm, for example, such as from about 1 nm to about 70 nm, or from about 1 nm to about 50 nm, from about 1 nm to about 25 nm, or from about 1 nm to about 10 nm. The particle size refers to the average diameter of the metal particles, as determined by TEM (transmission electron microscopy) or DLS (dynamic light scattering), such as, for example, a $Z_{ave}$ particle size as reported using Malvern dynamic light scattering techniques. Generally, a plurality of particle sizes may exist in the metal nanoparticles obtained from the process described herein. In embodiments, the existence of different sized metal-containing nanoparticles is acceptable.

In embodiments, the metal nanoparticles are composed of (i) one or more metals or (ii) one or more metal composites. Any suitable metals can be employed. Examples of metals include Al, Ag, Au, Pt, Pd, Cu, Co, Cr, In, and Ni, particularly the transition metals, such as, Ag, Au, Pt, Pd, Cu, Cr, Ni, and mixtures thereof. Suitable metal composites may include Au—Ag, Ag—Cu, Ag—Ni, Au—Cu, Au—Ni, Au—Ag—Cu, and Au—Ag—Pd. The metal composites may also include non-metals, such as, for example, Si, C, and Ge. The various components of the metal composite may each be present in the composite in any amount, such as amounts ranging for example from about 0.01% to about 99.9% by weight, particularly from about 10% to about 90% by weight, with the amounts being adjusted to provide desired characteristics, such as to provide the desired conductivities for the resulting printed features.

In an embodiment, the metal nanoparticles comprise silver. For example, the metal of the nanoparticles can be a metal alloy composed of silver and one, two or more other metals, with silver comprising, for example, at least about 20% of the nanoparticles by weight, particularly greater than about 50% of the nanoparticles by weight. Unless otherwise noted, the weight percentages recited herein for the components of the metal nanoparticles do not include the weight of any stabilizer or oxide formation that may be part of the nanoparticle.

The metal nanoparticles may be a mixture of two or more bimetallic metal nanoparticle species, such as those described in commonly assigned U.S. patent application Ser. No. 12/113,628 to Naveen Chopra et al., filed May 1, 2008 (now abandoned), which is incorporated herein by reference in its entirety, or a bimodal metal nanoparticle, such as those described in U.S. patent application Ser. No. 12/133,548 to Michelle N. Chretien filed Jun. 5, 2008 now U.S. Pat. No. 7,749,300, which is also incorporated herein by reference in its entirety.

The ink compositions of the present disclosure can include any suitable amount of metal nanoparticles. In an embodiment, the metal nanoparticles are in a concentration ranging from about 10 wt. % to about 90 wt. %, such as about 30 wt. % to about 70 wt. %, such as about 40 wt. % to about 60 wt. %, based on the total weight of the ink composition.

The metal nanoparticles can optionally include one or more organic stabilizing groups, such as both a first stabilizing group and a second stabilizing group, attached thereto to form a stabilized nanoparticle complex. Stabilizing groups (which may be referred to herein as stabilizers, stabilizer groups or ligands) are generally well known in the art for enhancing or maintaining the dispersibility of nanoparticles and/or to reduce aggregation of the nanoparticles in the composition. The term "attached" in the context of the stabilizing groups being attached to the nanoparticles means that the stabilizer is generally physically or chemically associated with the surface of the nanoparticles. In this way, the nanoparticles (e.g., silver nanoparticles or other metal nanoparticles described herein) have the stabilizer thereon outside of a liquid solution. That is, the nanoparticles with the stabilizer thereon may be isolated and recovered from a reaction mixture solution used in forming the nanoparticle and stabilizer complex. The stabilized nanoparticles may thus be subsequently readily and homogeneously dispersed in a solvent for forming a printable liquid.

As used herein, the phrase "physically or chemically associated" used to describe the attachment between the nanoparticles and the stabilizer may be a chemical bond and/or other physical attachment. The chemical bond may take the form of, for example, covalent bonding, hydrogen bonding, coordination complex bonding, or ionic bonding, or a mixture of different chemical bonds. The physical attachment may take the form of, for example, van der Waals' forces or dipole-dipole interaction, or a mixture of different physical attachments. The stabilizer can be attached to the nanoparticle via a linking group or directly to the nanoparticle itself.

The term "organic" in "organic stabilizing group" or "organic stabilizer" refers to, for example, the presence of carbon atom(s), but the organic stabilizer may include one or more non-metal heteroatoms such as nitrogen, oxygen, sulfur, silicon, halogen, and the like. The organic stabilizer may be an organoamine stabilizer such as those described in U.S. Pat. No. 7,270,694, which is incorporated by reference herein in its entirety. In an embodiment, the first organic stabilizing group is selected from the group consisting of decylamine, undecylamine, dodecylamine, tridecylamine, tetradecylamine and mixtures thereof. In an embodiment, the second organic stabilizing group is selected from group consisting of butylamine, pentylamine, hexylamine, heptylamine, octylamine, nonylamine, decylamine and mixtures thereof. For example, the first organic stabilizing group can be selected from the group consisting of hexylamine, heptylamine, octylamine, nonylamine, decylamine, and mixtures thereof, and the second organic stabilizing groups can be selected from the group consisting of undecylamine, dodecylamine and tridecylamine, and mixtures thereof.

In an embodiment, additional stabilizers that are different from the first and second stabilizers may be used. For example, additional stabilizers can optionally be chosen from any of butylamine, pentylamine, hexylamine, heptylamine, octylamine, nonylamine, decylamine, undecylamine, dodecylamine, tridecylamine, tetradecylamine, hexadecylamine, diaminopentane, diaminohexane, diaminoheptane, diaminooctane, diaminononane, diaminodecane, diaminooctane, dipropylamine, dibutylamine, dipentylamine, dihexylamine, diheptylamine, dioctylamine, dinonylamine, didecylamine, methylpropylamine, ethylpropylamine, propylbutylamine, ethylbutylamine, ethylpentylamine, propylpentylamine, butylpentylamine, tributylamine, trihexylamine, and the like, or mixtures thereof.

As shown in the examples herein below, in one embodiment, the nanoparticles of the present disclosure may be effectively stabilized using a mixture of octylamine and dodecylamine binders. The use of both octylamine and dodecylamine resulted in stabilized silver particles of small size (e.g. less than 100 nm) and with a lower annealing temperature than a particle made with 100% dodecylamine stabilizer. On the other hand, the use of octylamine alone (e.g., without dodecylamine) did not provide the desired stabilization and so resulted in particles that were too large. Inks formulated from the particles that were made in one particular embodiment using both dodecylamine and octylamine are able to be annealed at low temperatures (e.g., 80° C. or less) in a short time (10-30 minutes) to give highly conductive traces (>10,000 s/cm). Such low anneal temperatures can enable the printing of conductive traces on many substrates that are sensitive to high temperatures, such as plastic films and other polymeric objects. It will also allow low temperature deposition of conductors (e.g. electrodes and other conductive elements) on polymer parts made by 3D printing, thereby making it possible to create smart components for many applications.

While the examples of the present disclosure employ dodecylamine and octylamine, it is expected that certain other combinations of organoamines could also be employed to achieve reduced annealing temperatures when compared with dodecylamine alone. For instance, based on the results using octylamine and dodecylamine, it is expected that any one of hexylamine, heptylamine, nonylamine and decylamine could be used in combination with dodecylamine to achieve an anneal temperature that is lower than if dodecylamine were used alone. It is also expected that dodecylamine together with various combinations of two or more of hexylamine, heptylamine, octylamine, nonylamine, decylamine and undecylamine could be employed to achieve an anneal temperature that is lower than if dodecylamine were used alone.

The organoamines can be attached to the nanoparticles in any desired manner, such as via a carboxylate linking group or other carboxylic acid derived linking group, as in the carboxylic acid-organoamine complex stabilized silver nanoparticles mentioned herein. The organoamines may, after attachment to the silver nanoparticles, potentially be considered groups other than amines, such as amide groups and so forth. However, for purposes of this disclosure, it is to be understood that when referring to organoamines either prior to or after attachment to the nanoparticle, the organoamines are named based on their structures prior to attachment to the silver nanoparticle, whether or not they remain amines after attachment.

Where two or more stabilizers are used, each stabilizer may be present either in the composition employed for making the nanoparticles, or as part of the final nanoparticle product, at any suitable weight ratio, such as for example, from about 99 (first stabilizer): 1 (second stabilizer) to about 1 (first stabilizer): 99 (second stabilizer). As additional examples, where a first and second organoamine are used, any suitable ratio of the first organoamine to the second organoamine can be used that will provide the desired small particle sizes and low temperature anneal. For instance, the molar ratio of the first organoamine to the second organoamine employed in the compositions for making the nanoparticles can range from about 1:5 to about 5:1, such as about 1:4 to about 4:1, or about 1:3 to about 3:1, or about 3:2 to about 2:3, or about a 1:1 ratio. In an embodiment where the first organoamine is dodecylamine and the second organoamine is octylamine, the amounts of organoamines employed to make the nanoparticles can range, for example, from about 30 mole % to about 80 mole %, such as about 35 mole % to about 75 mole %, octylamine and about 70 mole % to about 20 mole %, such as about 65 mole % to about 25 mole %, dodecylamine, based on the total molar amount of organoamine (e.g., total amount of octylamine and dodecylamine) added as a stabilizer for making the metal-containing nanoparticles. In another embodiment, the range is about 40 mole % to about 60 mole % octylamine and about 60 mole % to about 40 mole % of dodecylamine, or about 45 mole % to about 55 mole % octylamine and about 55 mole % to about 45 mole % of dodecylamine, or about 50 mole % octylamine and about 50 mole % of dodecylamine, based on the total molar amount of organoamine added as a stabilizer for making the metal-containing nanoparticles.

The amount of the stabilizer used is, for example, from about 1 or more molar equivalents per mole of silver compound, or about 2 or more molar equivalents per mole of silver compound, or about 10 or more molar equivalents per mole of silver compound, or about 25 or more molar equivalents per mole of silver compound. Amounts outside of the range of about 1 to about 25 molar equivalents per mole of silver compound can also be employed.

Examples of other organic stabilizers include thiol and its derivatives, —OC(=S)SH (xanthic acid), polyethylene glycols, polyvinylpyridine, polyvinylpyrolidone, and other organic surfactants. The organic stabilizer may be selected from the group consisting of a thiol such as, for example, butanethiol, pentanethiol, hexanethiol, heptanethiol, octanethiol, decanethiol, and dodecanethiol; a dithiol such as, for example, 1,2-ethanedithiol, 1,3-propanedithiol, and 1,4-butanedithiol; or a mixture of a thiol and a dithiol. The organic stabilizer may be selected from the group consisting of a xanthic acid such as, for example, O-methylxanthate, O-ethylxanthate, O-propylxanthic acid, O-butylxanthic acid, O-pentylxanthic acid, O-hexylxanthic acid, O-heptylxanthic acid, O-octylxanthic acid, O-nonylxanthic acid, O-decylxanthic acid, O-undecylxanthic acid, O-dodecylxanthic acid. Organic stabilizers containing a pyridine derivative (for example, dodecyl pyridine) and/or organophosphine that can stabilize metal nanoparticles may also be used as a potential stabilizer.

Examples of stabilized metal nanoparticles include: the carboxylic acid-organoamine complex stabilized silver nanoparticles, described in U.S. Patent Application Pub. No. 2009/0148600; the carboxylic acid stabilizer silver nanoparticles described in U.S. Patent App. Pub. No. 2007/0099357 A1, and the thermally removable stabilizer and the UV decomposable stabilizers described in U.S. Patent Application Pub. No. 2009/0181183, each of which is incorporated by reference herein in its entirety.

As mentioned above, the stabilized metal nanoparticles of the present disclosure can be employed in various types of ink compositions, such as inkjet inks, pneumatic aerosol inks, gravure inks and flexographic inks. Formulations, including solvent systems and other ingredients, for making the inks of the present disclosure are described in more detail below.

Inkjet Inks

In an embodiment, the ink composition is an inkjet ink made by mixing ingredients comprising an ink vehicle suitable for inkjet inks and a plurality of the metal nanoparticles of the present disclosure, such as any of the organoamine stabilized nanoparticles discussed herein. The ink vehicle employed for inkjet inks can comprise, for example, a first solvent and a second solvent. The first solvent is nonpolar and has a boiling point above 160° C. at 1 atmosphere pressure. The second solvent is an aromatic hydrocarbon and has a boiling point above 230° C. at 1 atmosphere pressure, which is a higher boiling point than that of the first solvent.

The first solvent, which is a nonpolar solvent having a boiling point above 160° C. at 1 atmosphere pressure, can provide good dispersion stability for the organoamine stabilized metal nanoparticles of the present disclosure. In an embodiment, the dispersibility of the first solvent for silver nanoparticles can be better than that of the second solvent. It is noted that the term "solvent" is defined broadly herein to included compounds that act to disperse, rather than dissolve, the solid nanoparticles, although the solvents may optionally provide solubility for one or more other ingredients in the ink composition.

In an embodiment, the first solvent is a hydrocarbon. The term "hydrocarbon" for purposes of the present disclosure refers to an organic compound consisting entirely of hydrogen and carbon.

Examples of suitable first solvents include saturated or unsaturated $C_{10}$ to $C_{20}$ hydrocarbons having at least one cyclic group. In an embodiment, the at least one cyclic group can be a saturated or unsaturated 6 carbon group, such as a hexyl group. In an embodiment, the compound includes at least two saturated or unsaturated 6 carbon cyclic groups, which can be linked or fused, where one or both of the cyclic groups are optionally substituted with a linear or branched $C_1$ to $C_8$ hydrocarbyl group, such as methyl, ethyl, propyl or butyl. As an example, the first solvent can be a compound selected from the group consisting of bicyclohexane, decalin, naphthalene and combinations thereof, any of which can be unsubstituted or substituted with a linear or branched $C_1$ to $C_8$ hydrocarbyl group.

The first solvent can have a boiling point that is greater than 160° C. For example, the boiling point can range from about 180° C. to about 240° C., or about 200° C. to about 235° C., or about 220° C. to about 230° C., at 1 atmosphere pressure. The relatively high boiling point of the first solvent may correlate to a relatively low vapor pressure.

The second solvent can be any aromatic hydrocarbon that has a relatively high boiling point above 230° C. at 1 atmosphere pressure while still providing good dispersing characteristics for the metal nanoparticles. In an embodiment, the aromatic hydrocarbon can include a phenyl group substituted with one or more linear, branched or cyclic hydrocarbyl groups of sufficient length so as to provide the desired boiling point. In an embodiment, the second solvent is a $C_{10}$ to $C_{18}$ arylcycloalkane, such as phenylcyclohexane.

The second solvent can have a boiling point that is greater than 230° C. For example, the boiling point can range from about 235° C. to about 300° C., or about 235° C. to about 260° C., or about 235° C. to about 245° C., or about 240° C., at 1 atmosphere pressure. The relatively high boiling point of the second solvent is higher than that of the first solvent and may also correlate to a relatively low vapor pressure that is lower than that of the first solvent.

The combination of both the first solvent and the second solvent facilitates the dispersion of the metal nanoparticles and provides a uniform, stable nanoparticle dispersion. In an embodiment, the dispersion will remain stable for a period of time, such as a day, a week or a month or more, at room temperature. In an embodiment, the dispersion will remain stable for at least six months, such as a year or longer at a temperature of 5° C. Further, the solvent combination may help to reduce or prevent aggregation of the nanoparticles. By incorporating certain amounts of the first and second solvents in the metal nanoparticle inkjet ink formulation, the ink printing properties, such as latency, can be improved.

Any other suitable solvents can optionally be employed in the compositions of the present disclosure in addition to the first and second solvents. In an embodiment, any optional solvents that are included are non-aqueous, polar or nonpolar organic solvents. Examples of optional solvents may include, for example, aromatic hydrocarbons other than the second solvent, such as benzene, toluene, xylene, ethylbenzene, chlorobenzene, dichlorobenzene, trichlorobenzene, nitrobenzene, cyanobenzene and tetralin; an alkane, alkene or an alcohol having from about 10 to about 18 carbon atoms such as, undecane, dodecane, tridecane, tetradecane, hexadecane, hexadecane, 1-undecanol, 2-undecanol, 3-undecanol, 4-undecanol, 5-undecanol, 6-undecanol, 1-dodecanol, 2-dodecanol, 3-dodecanol, 4-dodecanol, 5-dodecanol, 6-dodecanol, 1-tridecanol, 2-tridecanol, 3-tridecanol, 4-tridecanol, 5-tridecanol, 6-tridecanol, 7-tridecanol, 1-tetradecanol, 2-tetradecanol, 3-tetradecanol, 4-tetradecanol, 5-tetradecanol, 6-tetradecanol, 7-tetradecanol, and the like; an alcohol, such as for example, terpineol (α-terpineol), β-terpineol, geraniol, cineol, cedral, linalool, 4-terpineol, lavandulol, citronellol, nerol, methol, borneol, hexanol, heptanol, cyclohexanol, 3,7-dimethylocta-2,6-dien-1-ol, 2-(2-propyl)-5-methyl-cyclohexane-1-ol and the like; isoparaffinic hydrocarbons, such as, for example, isodecane, isododecane, and commercially available mixtures of isoparaffins such as ISOPAR® E, ISOPAR G, ISOPAR H, ISOPAR L and ISOPAR M (all the above-mentioned ISOPAR products are manufactured by Exxon Chemical Company), SHELL-SOL® (made by Shell Chemical Company), SOLTROL® (made by Philips Oil Co., Ltd.), BEGASOL® (made by Mobil Petroleum Co., Inc.) and IP Solvent 2835 (made by Idemitsu Petrochemical Co., Ltd.); naphthenic oils; ethers, such as tetrahydrofuran; nitriles, such as acetonitrile; halogenated solvents, such as dichloromethane; amides such as N,N-dimethylformamide (DMF); and mixtures of any of the above solvents. One, two, three or more of the optional solvents may be used in addition to the first and second solvents.

The first and second solvents may be present at any suitable ratio. For example, a ratio by weight of the first solvent to the second solvent can range from about 99:1 to about 1:99, or from about 80:20 to about 20:80, or from about 70:30 to about 30:70. In an embodiment, more of the first solvent is employed than the second solvent.

In an embodiment where an optional polar solvent is employed, it may be used in relatively small amounts compared to the nonpolar solvents in the mixture. For example, the weight ratio of polar to nonpolar solvents can be less that 2:3, such as 1:2, 1:3, 1:4, 1:5 or 1:10 or less. In an embodiment, no optional solvents are added, so that substantially only the first and second solvents are included except minor amounts that may be added with the other ingredients (e.g., less than 10% by weight, such as 5% or 2% or 1% by weight or less, based on the total weight of the ink composition).

The total amount of the first and second solvents may be present in the metal nanoparticle ink composition in an amount of at least 10 wt. %, based on the wt. % of the entire composition, such as, for example from about 10 wt. % to about 90 wt. %, from about 20 wt. % to about 80 wt. %, from about 30 wt. % to about 70 wt. % and from about 40 wt. % to about 60 wt. % of the ink composition. In an embodiment, the total amount of the first and second solvents is included in the ink composition in an amount that is at least 50 wt. %, based on the wt. % of the entire ink composition.

The inkjet ink compositions of the present disclosure can have any viscosity suitable for inkjet ink printing. Example viscosity ranges for inkjet inks range from about 2 to 10 cps, such as about 4-6 cps, or about 4-5 cps at 25° C. Viscosity of the ink can be measured as described herein below.

The inkjet ink compositions of the present disclosure can include one or more additional optional ingredients suitable for use in metal nanoparticle inkjet inks. An example of one such optional ingredient is a polymeric adhesion promoter. Polymeric adhesion promoters can function to increase the adhesion of the metal nanoparticles upon deposition to a substrate and/or allow for a conductive film with an increased thickness, such as, for example, up to about 15 micrometers to be deposited on a substrate. The inclusion of a polymeric binder in the composition may also potentially improve the mechanical properties for the deposited conductive feature, such as resistance to scratching, increased flexibility and resistance to cracking. Any polymeric adhesion promoter may be included in the composition, such that a glass transition temperature of the polymeric adhesion promoter is lower than the heating temperature for the deposited composition, assuming the polymeric adhesion promoter is compatible with jettability and stability requirements for the ink formation.

Examples of polymeric adhesion promoters include organic polymeric film forming binders such as thermoplastic and thermosetting resins such as polycarbonates, polyesters, polyam ides, polyurethanes, polystyrenes, polyaryle­thers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, amino resins, phenylene oxide resins, terephthalic acid resins, phenoxy resins, epoxy resins, phenolic resins, polystyrene and acrylonitrile copolymers, polyvinyl­chloride, vinylchloride and vinyl acetate copolymers, acrylate copolymers, alkyd resins, cellulosic film formers, poly (amideimide), styrenebutadiene copolymers, vinylidenechloride-vinylchloride copolymers, vinylacetate-vinylidenechloride copolymers, styrene-alkyd resins, poly­vinylcarbazole, polyvinyl butyral resins and the like. These polymers may be, for example, block, random or alternating copolymers.

Examples of polyvinyl butyral resins (PVB) resins are disclosed in U.S. 201210043512, the disclosure of which is hereby incorporated by reference in its entirety. Commercial examples of PVB resins are manufactured under the trade name MOWITAL (Kuraray America), S-LEC (Sekisui Chemical Company), BUTVAR (Solutia, Inc.), and PIOLOFORM (Wacker Chemical Company).

Any suitable techniques can be employed for making the inkjet ink nanoparticle compositions of the present disclosure. For example, the method can comprise providing a metal nanoparticle dispersion made by mixing ingredients comprising the first solvent, second solvent and plurality of metal nanoparticles, wherein the first solvent, the second solvent and the nanoparticles are as described above. Any of the optional additional ingredients discussed herein can also be included in the mixture.

The metal nanoparticles can be stabilized as described above. Methods for making stabilized nanoparticles are well known in the art. Any suitable technique can be employed for making the stabilized metal nanoparticles used in the compositions of the present disclosure. As an example, the stabilized metal nanoparticles can be made using the techniques described in U.S. Patent Application No. 2017/0240758, the disclosure of which is incorporated herein by reference in its entirety.

Pneumatic Aerosol Inks

In embodiments, the present disclosure is directed to a nanoparticle ink composition particularly suited for pneumatic aerosol printing applications. These pneumatic aerosol ink compositions include the organoamine stabilized metal nanoparticles as described herein and an ink vehicle suitable for pneumatic aerosol inks. In an embodiment, the ink vehicle comprises a particular combination of aromatic hydrocarbon solvents and an aliphatic solvent, wherein the solvents are compatible with the metal nanoparticle, so as to provide the ink composition with certain characteristics favorable to pneumatic aerosol printing.

An aerosol printer is described, for example, in U.S. Patent Publication 2012/0038716, which is incorporated by reference herein in its entirety. U.S. Patent Publication 2012/0038716 describes an aerosol printer which has at least one atomizing chamber and at least one printing head with at least one nozzle, these being connected directly or via connection lines. Furthermore, the aerosol printer has process gas-, transport gas- and focusing gas lines. An aerosol printer can be characterized by the method of creating the aerosol. For example, an ultrasonic aerosol printer creates the aerosol via ultrasonic vibration and a pneumatic aerosol printer creates the aerosol mist using a pipe disposed in the ink chamber in direct contact with the ink.

The at least one aromatic hydrocarbon solvent can be any suitable or desired aromatic hydrocarbon solvent or combination of aromatic hydrocarbon solvents provided that the aromatic hydrocarbon solvent or solvents is compatible with the metal nanoparticle. As used herein, an aromatic hydrocarbon solvent that is compatible with, or has compatibility with, the metal nanoparticles means a solvent that forms a stable dispersion, without aggregation or phase separation. Further, in embodiments, the metal nanoparticles do not precipitate out of the dispersion.

In embodiments, the at least one aromatic hydrocarbon solvent is selected from the group consisting of phenylcy­clohexane, toluene, mesitylene, m-xylene, ethylbenzene, and combinations thereof.

The at least one aliphatic solvent can be any suitable or desired aliphatic solvent or combination of aliphatic solvents provided that the aliphatic solvent or solvents is compatible with the metal nanoparticles. As used herein, an aliphatic solvent that is compatible with, or has compatibility with, the metal nanoparticles means a solvent that forms a stable dispersion, without aggregation or phase separation. Further, in embodiments, the metal nanoparticles do not precipitate out of the dispersion.

In embodiments, the at least one aliphatic solvent is selected from the group consisting of ethylcyclohexane, methylcyclohexane, terpineol, bicyclohexane, decahydronaphthalene, cyclohexane, and combinations thereof.

In specific embodiments, the pneumatic aerosol ink composition herein comprises a silver nanoparticle; at least one aromatic hydrocarbon solvent that is compatible with the silver nanoparticle; and at least one aliphatic solvent that is compatible with the silver nanoparticle. In more specific embodiments, the ink composition comprises a silver nanoparticle; at least one aromatic hydrocarbon solvent selected from the group consisting of phenylcyclohexane, toluene, mesitylene, m-xylene, ethylbenzene, and combinations thereof; and at least one aliphatic solvent is selected from the group consisting of ethylcyclohexane, methylcyclohexane, terpineol, bicyclohexane, decahydronaphthalene, cyclohexane, and combinations thereof.

In embodiments, the selected aliphatic solvent is terpineol, including the isomeric forms of alpha-, beta-, gamma- and 4-terpineol, or mixtures thereof, including mixtures of alpha-, beta- and gamma-terpineol or other relatively higher viscosity solvents, which enables lower amounts of metal nanoparticle, such as 45 percent by weight based on the total weight of the ink composition, which in turn enables achievement of printed line thicknesses of about 10 microns where desired. In an embodiment, the aliphatic solvent can be a low viscosity solvent. By low viscosity solvent, it is meant that the solvent has a viscosity of from about 0.5 to about 10 centipoise at a temperature of from about 20 to about 30° C.

The ink compositions for pneumatic aerosol printing can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes, up to about 24 hours. Alternatively, the optional ink additives can be mixed with the other ink ingredients during the ink preparation process, which takes place according to any desired procedure, such as by mixing all the ingredients, heating if desired, and filtering.

In embodiments, a process for preparing a pneumatic ink composition herein comprises combining a metal nanoparticle; at least one aromatic hydrocarbon solvent, wherein the at least one aromatic hydrocarbon solvent is compatible with the metal nanoparticles; and at least one aliphatic solvent, wherein the at least one aliphatic solvent is compatible with the metal nanoparticles; wherein the ink composition has a metal content of greater than about 60 percent by weight, based upon the total weight of the ink composition; wherein the ink composition has a viscosity of from about 5 to about 30 centipoise at a temperature of about 20 to about 30° C. In embodiments, wherein the metal nanoparticle is a silver nanoparticle or combination of silver nanoparticles. In embodiments, wherein the combination of solvents comprises at least one aromatic hydrocarbon solvent selected from the group consisting of phenylcyclohexane, toluene, mesitylene, m-xylene, ethylbenzene, and combinations thereof; and at least one aliphatic solvent selected from the group consisting of ethylcyclohexane, methylcyclohexane, terpineol, bicyclohexane, decahydronaphthalene, cyclohexane, and combinations thereof.

The metal nanoparticles can be present in the pneumatic ink composition in any suitable or desired amount. In an embodiment, the pneumatic ink composition has a metal content of about 40 to about 70 percent by weight, based upon the total weight of the ink composition. In another embodiment, the ink composition has a metal content of greater than 45 percent by weight, such as greater than about 45 percent to about 80 percent, or greater than about 45 percent to about 70 percent by weight, or about 60 percent by weight to about 70 percent by weight, based on the total weight of the ink composition.

Shear index can be measured by any suitable or desired method as known in the art, such as with an Ares G2 Rheometer from TA Instruments using a 50 millimeter cone, 0.053 microns gap, using a rate sweep run from 1 to 400 $s^{-1}$ and 400 to 4 $s^{-1}$ at 25° C.

In embodiments, the pneumatic aerosol ink compositions herein have a shear index of below 1.10. In embodiments, the ink compositions have a shear index of from about 0.9 to below 1.10.

Viscosity can be measured by any suitable or desired method as known in the art, such as with an Ares G2 Rheometer from TA Instruments. Viscosity data can be obtained, for example, at 25° C., on an Ares G2 Rheometer from TA Instruments using a 50 millimeter cone, 0.053 micron gap.

In embodiments, the pneumatic aerosol ink composition is a high-viscosity composition. In embodiments, the pneumatic aerosol ink composition disclosed herein has a viscosity of from about 8 to about 100, or from about 10 to about 80, or from about 15 to about 60 centipoise at a temperature of about 25° C. In further embodiments, the ink composition has a viscosity of from about 45 to about 30, or from about 8 to about 30, or from about 9 to about 15, or from about 10 to about 15, or from about 10 to about 13 centipoise at a temperature of about 25° C. In certain embodiments, the pneumatic aerosol ink has a viscosity of from about 5 to about 30 centipoise at a temperature in the range of from about 20 to about 30° C. and shear rate of from about 40 to about 400 $s^{-1}$.

In embodiments, the pneumatic aerosol ink composition has a viscosity of from about 5 to about 30 centipoise at a temperature of about 20 to about 30° C.

The organoamine stabilized particles of the present disclosure can be employed in other types of inks besides inkjet inks and pneumatic aerosol inks, such as gravure inks and flexographic inks. Suitable ink vehicles for such inks are well known in the art. One of ordinary skill in the art would be able to formulate various types of inks using the appropriate ink vehicle for the type of ink being used (e.g., gravure inks, flexographic inks and so forth).

Printing Process

An embodiment is also directed to a method of printing using any of the inks of the present disclosure. The method comprises providing a metal nanoparticle ink composition and printing the ink composition onto a substrate. Any of the inks of the present disclosure can be employed. Suitable inkjet printing processes, pneumatic aerosol inkjet printing process, as well as printing processes, such as processes for printing gravure inks and flexographic inks can be employed. Examples of such processes are well known in the art.

Any of the ink compositions described herein can be employed in the printing process of the present disclosure. The ink compositions can be printed on the substrate to form a nanoparticle ink pattern using any suitable printer and printing technique, such as an inkjet printer using an inkjet printing technique, a pneumatic printer using a pneumatic aerosol printing technique, a gravure printer using a gravure printing technique, a flexographic printing press using a flexographic printing technique or other suitable printing process. Examples of suitable inkjet printers, pneumatic aerosol printers, gravure printers, and flexographic printing presses and printing techniques for using them are well known in the art.

The substrate upon which the metal nanoparticle ink compositions of the present disclosure are printed may be any suitable substrate, including, for example, silicon, glass, plastic or other polymers, fabric, or paper. For structurally flexible devices, plastic substrates, such as for example, polyester, polycarbonate, polyimide sheets and the like may be used. The substrate may have any desired thickness, such as, for example, from about 10 micrometers to over 10 millimeters, such as from about 50 micrometers to about 2 millimeters, or from about 0.4 millimeters to about 10 millimeters.

After selectively depositing the metal nanoparticle ink composition to form a nanoparticle ink pattern on the substrate during printing, the ink can be heated to a desired annealing temperature to form a desired conductive metal pattern on the substrate. Any suitable annealing temperatures can be employed. The annealing temperatures used can depend on a variety of factors, such as the particular metal nanoparticles being used, the ability of the substrate to withstand high temperatures, the desired properties of the resulting film, and so forth. Examples include temperatures ranging from about 40° C. to about 200 or 250° C. For example, the deposited composition can be heated to a temperature at or below 160° C., such as, for example, from about 50° C. to about 140° C., or from about 60° C. to about 130° C., to induce or "anneal" the metal nanoparticles to form conductive features which are suitable for use as an electrically conductive element. In embodiments, the stabilized metal-containing nanoparticles can have an annealing point of lower than about 130° C.; lower than about 120° C.; or lower than about 110° C. For example, the annealing temperature can be from about 40° C. to about 110° C., such as about 50° C. to about 100° C., or 50° C. to about 80° C., or 55° C. to about 70° C., or 55° C. to about 65° C.

The heating can be performed for any suitable time ranging from, for example, 1 minute to about 10 hours, from about 5 minutes to about 5 hours and from about 10 minutes to about 3 hours. In an embodiment, heating at the above described temperature ranges that is sufficient to provide the desired conductivity (e.g., such as a conductivity that is greater than 10,000 S/cm) can be accomplished in a relatively short time, such as, for example, about 1 minute to about 1 hour, or from about 5 minutes to about 50 minutes, or about 5 minutes to about 40 minutes, or 10 minutes to about 30 minutes. In other embodiments, the conductivity achieved by the above described annealing temperatures and times can range from about 10,000 Siemens/centimeter ("S/cm") to about 500,000 S/cm, or about 20,000 S/cm to about 500,000 S/cm, or about 30,000 S/cm to about 500,000 S/cm. The conductivities reported herein can be determined using the Keithley 4200A-CSC to measure resistance at room temperature (e.g., about 25° C.) and the Dektak stylus profile to measure film thickness. The heating can be performed in air, in an inert atmosphere, for example, under nitrogen or argon, or in a reducing atmosphere, for example, under nitrogen containing from 1 to about 20 percent by volume hydrogen. The heating can also be performed under normal atmospheric pressure or at a reduced pressure of, for example, from about 1000 mbars to about 0.01 mbars.

As used herein, the term "heating" encompasses any technique(s) that can impart sufficient energy to the heated material or substrate to (1) anneal the metal nanoparticles and/or (2) remove the optional stabilizer from the metal nanoparticles. Examples of heating techniques may include thermal heating (for example, a hot plate, an oven, and a burner), infra-red ("IR") radiation, a laser beam, a lamp or other photon source (e.g., such as used in photonic annealing), microwave radiation, or UV radiation, or a combination thereof. In an embodiment, the inks are annealed using photonic annealing.

Heating produces an electrically conductive pattern from the deposited metal nanoparticle ink composition. In embodiments, after heating, the resulting electrically conductive pattern has a thickness ranging, for example, from about 5 nanometers to about 500 micrometers, such as from about 10 nanometers to about 200 micrometers, or from about 100 nanometers to about 100 micrometers, from about 1 micrometers to about 25 micrometers, or from about 10 micrometers to about 20 micrometers.

EXAMPLES

Example 1

Preparation of Dodecylamine-Stabilized Silver Nanoparticles

To a 3-neck round-bottom reaction flask, dodecylamine (444.55 g), decalin (150 mL), and methanol (30 mL) were added and the mixture was heated with good stirring up to ~37° C. until dodecylamine was dissolved. Then, a reducing agent phenylhydrazine (32.70 g) was added to the solution with good stirring for ~5 minutes. Silver acetate (100 g) was added gradually in duration of ~1.5 to 2.0 hours at a temperature range of 35 to 38° C. The color of the reaction mixture was changed from clear to dark brownish during the addition, indicating the formation of silver nanoparticles. After the addition, the reaction mixture was heated to 40° C. and was stirred at this temperature for one hour.

The crude product was precipitated by adding 750 mL of MeOH with good stirring for 10 minutes and then collected by filtration. The collected wet cake was transferred to a glass beaker and stirred in 250 mL of methanol for 30 minutes twice. The final product was collected by filtration and dried in a vacuum oven at room temperature for 24 hours, yielding 68.3 g of stabilized silver nanoparticles with dark blue color.

Example 2A

Preparation of New Silver Nanoparticle Ink

A new silver nanoparticle ink sample was prepared from the silver nanoparticles of Example 1. The ink contained approximately 50 wt % silver nanoparticles in bicyclohexane (BCH):phenylcyclohexane (3:2 by weight). The following procedure was used to make the ink. To 50 grams of silver nanoparticles powder in a brown glass container (120 mL), both bicyclohexane (30 g) and phenylcyclohexane (20 g) were added. The resulting mixture was mixed by gently shaking the sample using an orbital mixer for about 2 hours and then placed on a roll mill at low speed for 22 hours. After this period of mixing, the resulting mixture was filtered with a 1 um glass fiber syringe filter, yielding ~98 g of the conducting silver nanoparticle ink.

Comparative Example 2B

Silver Nanoparticle Ink

A second silver nanoparticle ink sample was made that was similar to that of Example 2A, except that the approximately 50 wt % silver nanoparticles were dispersed in decalin:bicyclohexane (BCH) (3:2 by weight) instead of BCH and phenylcyclohexane.

Example 3

Printing Test

A printing test of this conductive ink was carried out by inkjet with a Dimatix printer. The printing stability or latency time was evaluated according to the following experiment conditions: The print head was kept on the drop watcher without purging while testing was performed at various time intervals to examine how many nozzles still jetted. The total Dimatix print head nozzles were 16. The results were tabulated in the table shown in FIG. 2, where the degree of shading shows the number of nozzles working.

Figure 2:
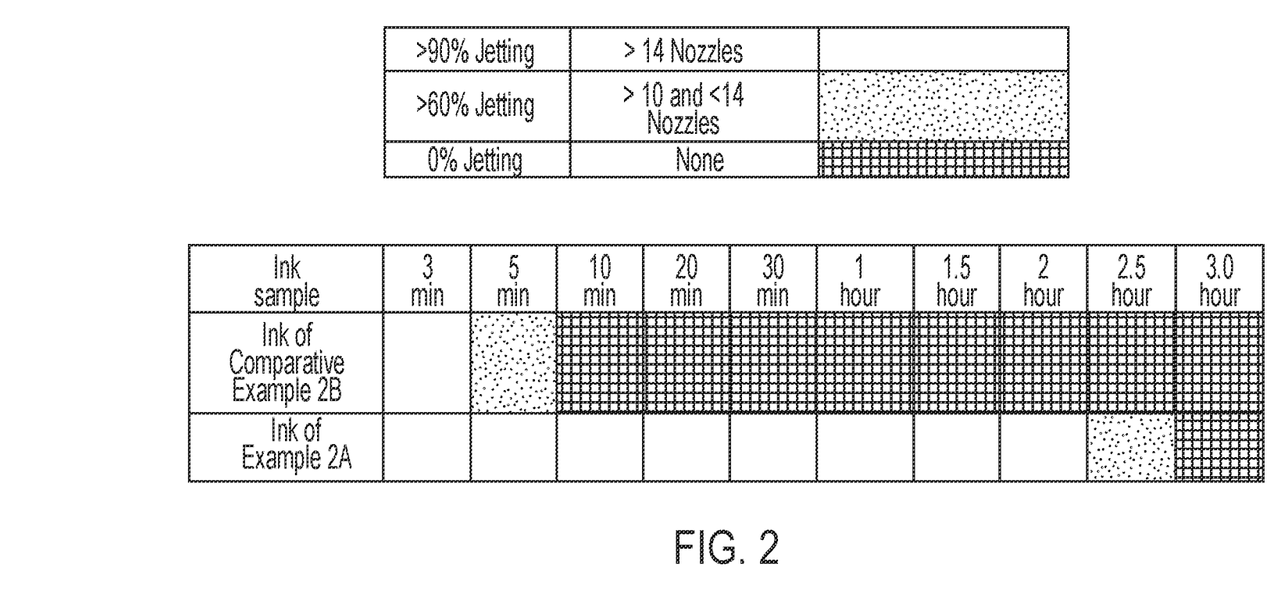
FIG. 2 is a table showing results of a printing test, according to an example of the present disclosure.

The data indicated excellent printing stability of the ink of Example 2A, as well as the continued formation of stable droplets. More specifically, the printing nozzles of a printer cartridge containing the silver nanoparticle ink of Example 2A could continue to print after the printer was idled for over 2 hours (with no purging required). The printing latency time was dramatically improved compared with the comparative inkjet ink formulation of Example 2B. For example, the printing nozzles of a printer cartridge containing the inkjet silver nanoparticle ink of Example 2B required purging after the printer was idled only for a very short period of time (~3 minutes). This dramatic improvement in printing stability was achieved due to the optimal ink composition with optimally ranged ink properties including viscosity, surface tension, and where the inks' carrier solvents are high boiling point to prevent ink wicking out, evaporating, etc. from printing cartridge nozzles and then drying to block the nozzles during the printing, especially when the printer was set in "idle mode". Solvents with good dispersion stability for silver nanoparticles, sufficiently high boiling point and sufficiently low vapor pressure resulted in the improved printing stability.

Figure 1:
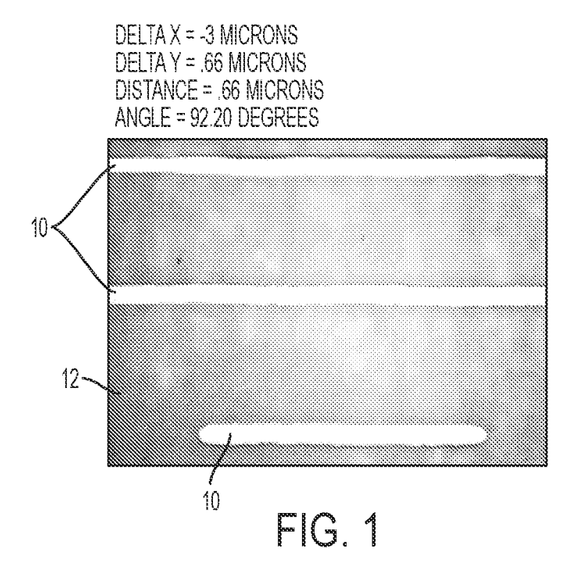
FIG. 1 shows straight lines on a glass substrate, where the lines were printed using metal nanoparticle ink with a Dimatix printer, according to an example of the present disclosure.

In addition to good printing stability, printed features made with the ink of Example 2A, such as printed lines on glass, PET and PEN substrates were highly conductive (~100,000 S/cm) after they were annealed at 120° C. for 10 min. Examples of printed features 10 printed on a glass substrate 12 using the ink of Example 2 and a Dimatix printer are shown in FIG. 1.

Thus, using inks of the present disclosure the printing latency time increased from about 3 to about 5 min (previous ink formulation) to about 2 hours to about 2.5 hours in a Dimatix printhead. The printing latency time may depend on the type of printer employed, and latency times of >24 hours may be possible in other, more industrially relevant, printheads. Thus, the conductive inks of the present disclosure have a high potential to be used in manufacturing production for a wide range of electronic device applications and inkjet printing technologies.

Comparative Example 4

Synthesis of Silver Nanoparticles Using Dodecylamine (Control)

To a 2 L 3 neck round bottom flask, fitted with an overhead stirrer, thermometer, condenser, and Ar line, was added molten dodecylamine (444.77 g, melted overnight at 50° C. in oven). The reaction flask was immersed in warm water (35-40° C.). MeOH (29.26 mL) was added followed by decalin (149.78 mL). Phenylhydrazine (26.17 g) was added with magnetic stirring, using some of the decalin to complete the transfer. The mixture was stirred until completely homogeneous, and the temperature was allowed to stabilize at 35° C. Silver acetate powder was slowly added through the top of the flask, maintaining the temperature at 35-40° C. Silver acetate was added over a period of 120 minutes. The reaction mixture was stirred for an additional 1 hour at 40° C.

MeOH (750 mL) was added and stirred for 10 minutes. The reaction product was filtered using a Buchner funnel with 2 filter media (Whatman 934AH glass fibre paper on bottom and Whatman #54 filter paper on top). Filtration took about 40 minutes. Filtrate was dark brown and filter cake was greyish-blue.

The filtrate sample was put in a brown bottle, flushed with Argon and stored in fridge. Particle size of the nanoparticle was assessed by dynamic light scattering using a Malvern Nano Zetasizer and Nano Sizer and the results are shown in Table 2 below, where D[1,0] is the average size (i.e., number mean) of the particles.

Example 5

Synthesis of Silver Nanoparticles Using 100% Octylamine

To a 250 mL 3 neck round bottomed flask, fitted with a magnetic stir bar, thermometer, condenser, and Ar line, was added octylamine (31.01 g). The flask was immersed in warm water (35-40° C.). MeOH (1.50 mL) was added followed by decalin (7.49 mL). Phenylhydrazine (1.31 g) was added with stirring, using some of the decalin to complete the transfer. Stirred mixture until completely homogeneous, and allowed temperature to stabilize at 35° C. Slowly added silver acetate powder while maintaining the temperature below 40° C. Solution turned brown upon adding silver acetate. Added the silver acetate over a period of 45 minutes. Allowed the reaction mixture to stir for another 1 hour at 40° C.

MeOH (7.5 mL) was added and stirred for 10 minutes during which a blue coating was formed on the walls of the flask, an indication of the formation of nanoparticles. The reaction product was filtered on a Buchner funnel with 2 filter media (Whatman 934AH glass fiber paper on bottom and Whatman #54 filter paper on top) to give a bluish-grey filter cake and a brown filtrate. Washed filter cake with MeOH (25 mL). Filter cake was put in a 30 mL brown bottle, flushed with argon and stored in fridge. Particle size of the nanoparticle was assessed using Malvern dynamic light scattering and the results are shown in Table 2 below.

Example 6

Synthesis of Silver Nanoparticles Using a 20:80 Ratio of Dodecylamine to Octylamine To a 100 mL 3 neck round bottomed reaction flask fitted with a magnetic stir bar, thermometer, condenser, and Ar line, was added molten dodecylamine (22.21 g) and octylamine (79.21 g). The reaction flask was immersed in warm water (35-40° C.) and MeOH (7.5 mL) was added, followed by decalin (75 mL). Phenylhydrazine (13.09 g) was then added with stirring, using some of the decalin to complete the transfer. The mixture was stirred until completely homogeneous, and the temperature was allowed to stabilize at 35° C. Silver acetate (25 g) powder was slowly added through the top of the reaction flask while maintaining the temperature at 35-40° C. Silver acetate was added over 50 minutes and the reaction mixture was stirred for another 1 hour at 40° C. MeOH (187.5 mL) was added and the mixture was stirred for 10 minutes. The reaction product was filtered on a Buchner funnel with 2 filter media (Whatman 934AH glass fiber paper on bottom and Whatman #54 filter paper on top). Filtration took about 15 minutes. Filtrate was dark brown and wet filter cake was bluish-grey. The wet filter cake was put in a 30 ml brown bottle, flushed with Argon and stored in fridge. The $Z_{ave}$ particle size of the nanoparticle was assessed by dynamic light scattering using a Malvern Nano Zetasizer and Nano Sizer and the results are shown in Table 2 below, where D[1,0] is the number mean (i.e., the average) size of the particles. Silver content (Ash) was assessed using MLS PYRO High Temperature Microwave Ash Furnace and the data is shown in Table 2 below.

Example 7

Synthesis of Silver Nanoparticles Using a 30:70 Ratio of Dodecylamine to Octylamine Silver nanoparticles were synthesized using a similar procedure as in Example 6 except that a ratio of 30:70 dodecylamine to octylamine was used.

Example 8

Synthesis of Silver Nanoparticles Using a 50:50 Ratio of Dodecylamine to Octylamine Silver nanoparticles were synthesized using a similar procedure as in Example 6 except that a ratio of 50:50 dodecylamine to octylamine was used.

Example 9

Synthesis of Silver Nanoparticles Using a 60:40 Ratio of Dodecylamine to Octylamine Silver nanoparticles were synthesized using a similar procedure as in Example 6 except that a ratio of 60:40 dodecylamine to octylamine was used.

Example 10

Larger Scale Synthesis of Silver Nanoparticls Using a 60:40 Ratio of Dodecylamine to Octylamine Silver nanoparticles were synthesized using a similar procedure as in Example 9 except that the scale was increased 10 times.

TABLE 2

Silver Nanoparticles with Different Stabilizers. The amount of $R_1$ and $R_2$ are each shown as mole % based on a total molar amount of organoamine added as a stabilizer for making the metal nanoparticles.

| Particle ID | $R_1$ ($C_{12}$) (Mole %) | $R_2$ ($C_8$) (Mole %) | Scale AgOAc Weight (g) | Particle size (nm) $Z_{ave}$ | D[1, 0] | Ash (wt %) |
|---|---|---|---|---|---|---|
| Comparative Example 4 | 100% | 0 | 100 | 30 | 7.4 | ND |
| Example 5 | 0 | 100% | 5 | 433 | 7.3 | ND |
| Example 6 | 20% | 80% | 25 | 177.6 | 9.1 | 89.81 |
| Example 7 | 30% | 70% | 25 | 76.7 | 8.3 | ND |
| Example 8 | 50% | 50% | 35 | 10.3 | 7.8 | ND |
| Example 9 | 60% | 40% | 5 | 23 | 7.4 | 88.8 |
| Example 10 | 60% | 40% | 50 | 51 | 8 | ND |

Initial attempts to synthesize particles using higher percentages of octylamine (70-100%) as the stabilizer resulted in the formation of particles that were too large, as indicated by the $Z_{ave}$ shown in Examples 5 to 7 of Table 2, and therefore was not considered successful. Mixtures of 50-60% dodecylamine and 40-50% octylamine gave particles with acceptable particle size, as shown in Examples 8-10 of Table 2. Inks were formulated using some of the silver nanoparticles, as will be described in the examples below.

Comparative Example 11A

Preparation of Silver Concentrate (Control)

Silver nanoparticles (250.57 g), prepared as outlined in Example 2 of US2010/0240758A1 were added to a tared stainless steel jacketed beaker. Bicyclohexane (94.50 g) was added and the solvent was stirred with a spatula. The beaker was secured with clamps in a bath set to 26° C. A sawtooth agitator was lowered into the beaker and set at 400 RPM. A nitrogen septum needle was lowered into the beaker, 1 cm from bottom. The mixture was agitated for 10 minutes and then agitation was stopped. Big chunks of silver particles in the mixture were broken with a spatula. Agitation was continued for a total of 4 hours to give silver concentrate with the following properties: Ash (60.55%), $Z_{ave}$ (19.4 nm) and D[1,0] 7.4 nm. The concentrate was dispensed into two 250 mL amber glass bottles and purged with argon. The bottles were sealed with white tape and stored in the fridge.

Comparative Example 11B

Preparation of Silver Nanoparticle Ink (Control)

Silver nanoparticle concentrate of control Example 11A (109.65 g) was transferred to a pre-weighted 120 mL amber bottle and weighted again. Bicyclohexane (10.16 g) and Phenylcyclohexane (30.01 g) were added. The mixture was blanketed with argon, sealed with 3M tape, labeled and placed on a Movil Rod overnight (about 18 hours). The resulting ink was filtered with 1 μm Pall Acrodisc glass fiber syringe filter, transferred to a pre-weighted amber glass bottle and labeled as the final ink. The bottle was purged with Argon, sealed with white 3M tape and store in a fridge. Table 3 below shows the ink formulation and resulting ink properties.

Example 12A

Preparation of Silver Concentrate

To a 25 mL round bottom flask, fitted with a magnetic stir bar was added silver nanoparticles of Example 6 (7.4 g) and the flask was immersed in a water bath and the temperature was maintained at 8° C. by adding ice. Bicyclohexane (2.0 g) was added and argon was purged deep into the mixture using a long needle. The mixture was stirred (700 rpm) at 8° C. for 1.5 hours and at 23° C. for 6 hours to give silver concentrate with the following properties: Ash (69.38%). The concentrate was transferred to a 30 mL brown bottle, flushed with argon and stored in a fridge.

Example 12B

Preparation of Silver Nanoparticle Ink

Silver nanoparticle concentrate of Example 12A (6.80 g) was transferred to a pre-weighted 30 mL amber bottle and weighed again. Added bicyclohexane (3.58 g) and phenylcyclohexane (2.14 g) to the concentrate. The mixture was blanketed with argon, sealed with 3M tape, labeled and placed on orbital mixer for 2 hours followed by rolling on a Movil Rod for 22 hours. Resulting ink was filtered through a 1 μm Pall Acrodisc glass fiber syringe filter and transferred to a pre-weighed amber glass bottle and labeled as the final ink, purged with Argon, sealed with white 3M tape and stored in fridge. Table 3 below shows the ink formulation and resulting ink properties.

Example 13A

Preparation of Silver Concentrate

A procedure similar to that of Example 12A was followed except that the silver nanoparticles of Example 7 were used to make related silver concentrate. Table 3 below shows the ink formulation and resulting ink properties.

Example 13B

Preparation of Silver Nanoparticle Ink

A procedure similar to that of Example 12B was followed except that silver concentrate of Example 13A was used to make a silver ink. Table 3 below shows the ink formulation and resulting ink properties.

Example 14A

Preparation of Silver Concentrate

A procedure similar to that of Example 12A was followed except that silver nanoparticles of Example 8 were used to make a silver concentrate.

Example 14B

Preparation of Silver Nanoparticle Ink

A procedure similar to that of Example 12B was followed except that silver concentrate of Example 14A was used to make a silver ink. Table 3 below shows the ink formulation and resulting ink properties.

Example 15A

Preparation of Silver Concentrate

A procedure similar to that of Example 12A was followed except that silver nanoparticles of Example 10 were used to make a silver concentrate.

Example 15B

Preparation of Silver Nanoparticle Ink

A procedure similar to that of Example 12B was followed except that silver concentrate of Example 15A was used to make a silver ink. Table 3 below shows the ink formulation and resulting ink properties.

TABLE 3

Silver Nanoparticle Ink Formulation and Properties

| Ink Component | Lot # | Control Ink Example 11B (xcm-nsIJ) weight (g) | Ink Example 12B weight (g) | Ink Example 13B weight (g) | Ink Example 14B weight (g) | Ink Example 15B weight (g) |
|---|---|---|---|---|---|---|
| Silver concentrate | Example 11A | 109.6 | | | | |
| | Example 12A | | 6.80 | | | |
| | Example 13A | | | 7.04 | | |
| | Example 14A | | | | 32.24 | |
| | Example 15A | | | | | 7.04 |
| Bicyclohexane | ADDR001 (Solutia) | 10.39 | 3.58 | 3.29 | 14.46 | 1.76 |
| Phenylcyclohexane | 040215H17N (Oakwood Products) | 60.29 | 2.14 | 1.13 | 8.9 | 2.2 |
| Ink Properties | | | | | | |
| Viscosity (cps) | | 5.86 | ND | ND | 5.26 | 5 |
| $Z_{ave}$ (nm) | | 18.3 | ND | 10 | 12.4 | ND |
| D[1, 0] (nm) | | 7.3 | ND | 7.2 | 7.6 | ND |

The inks of Table 3 were jetted using a Dimatix inkjet printer onto glass substrates. The resulting films were annealed at different temperatures as shown in Table 4 below. Conductivity of the annealed films was determined using a Keithley 4200A-CSC to measure resistance and a Dektak stylus profile to measure film thickness. The nanoparticle ink of the present disclosure (e.g., inks of Examples 14B and 15B) gave highly conductive films at lower temperatures compared to the control ink of Example 11B, indicating that the use of a combination of octylamine and dodecylamine as a stabilizer significantly reduced the annealing temperature.

TABLE 4

Silver Nanoparticle Ink Conductivities at Different annealing Temperatures and Times

| | Conductivity (S/cm) | | |
|---|---|---|---|
| Ink ID | 60° C./10 min | 60° C./30 min | 80° C./30 min |
| Ink of Example 11B with dodecylamine alone (Control) | Not Conductive | Not Conductive | 60000 |
| Ink of Example 12B | 0.2 | 0.5 | 60300 |
| Ink of Example 13B | 5940 | 15800 | 67900 |
| Ink of Example 14B | 47900 | 82100 | 135000 |
| Ink of Example 15B | 1.1 | 60000 | 92000 |

As shown by the results above, silver nanoparticles were effectively stabilized using a mixture of octylamine and dodecylamine binders. The lower boiling point of octylamine resulted in a particle with a lower annealing temperature than a particle with 100% dodecylamine stabilizer. The particles had a very small particle size. The inkjet inks formulated from the particles of this disclosure were able to be annealed at very low temperatures (e.g., 60° C.) in a short time (e.g., 10-30 minutes) to give highly conductive traces (e.g., >10,000 s/cm). This will enable the printing of conductive traces on many substrates that are sensitive to high temperatures, such as plastic films and polymeric objects, making it possible to create smart components for many applications. Similar results are expected for other inks, such as pneumatic aerosol inks, ultrasonic aerosol inks, flexographic inks and gravure inks if the same silver nanoparticles stabilized using a mixture of octylamine and dodecylamine binders are employed.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A metal nanoparticle ink composition comprising:
an ink vehicle comprising a first solvent and a second solvent; and
a plurality of metal nanoparticles dispersed in the ink vehicle, the metal nanoparticles including both a first organic stabilizing group and a second organic stabilizing group attached thereto, an alkyl moiety of the first organic stabilizing group having a longer carbon chain length than an alkyl moiety of the second organic stabilizing group, the first organic stabilizing group being selected from the group consisting of decylamine, undecylamine, dodecylamine, tridecylamine, tetradecylamine and mixtures thereof, and the second organic stabilizing group being selected from group consisting of butylamine, pentylamine, hexylamine, heptylamine, octylamine, nonylamine, decylamine and mixtures thereof,
wherein the first solvent is a compound selected from the group consisting of bicyclohexane, decalin, naphthalene and combinations thereof, and the second solvent is phenylcyclohexane.

2. The composition of claim 1, wherein the first organic stabilizing group is selected from the group consisting of undecylamine, dodecylamine, tridecylamine and mixtures thereof.

3. The composition of claim 2, wherein the first organic stabilizing group is dodecylamine.

4. The composition of claim 3, wherein the second organic stabilizing group is selected from the group consisting of hexylamine, heptylamine, octylamine, nonylamine, decylamine and mixtures thereof.

5. The composition of claim 4, wherein the second organic stabilizing group is octylamine.

6. The composition of claim 5, wherein the amount of the octylamine ranges from about 40 mole % to about 60 mole % and the amount of the dodecylamine ranges from about 60 mole % to about 40 mole %, based on a total molar amount of organoamine added as a stabilizer for making the metal nanoparticles.

7. The composition of claim 1, wherein the metal nanoparticle ink composition is an inkjet ink.

8. The composition of claim 1, wherein the metal nanoparticles have a size ranging from about 0.5 nm to about 100 nm, as measured by TEM.

9. The composition of claim 1, wherein the metal nanoparticles comprise at least one metal selected from the group consisting of Al, Ag, Au, Pt, Pd, Cu, Co, Cr, In and Ni.

10. The composition of claim 1, wherein the metal nanoparticle ink composition forms a metal framework with a conductivity of at least 10,000 S/cm when annealed at 60° C. for 30 minutes.

11. A metal nanoparticle ink composition comprising:
an ink vehicle; and
a plurality of metal nanoparticles dispersed in the ink vehicle, the metal nanoparticles including both a first organic stabilizing group and a second organic stabilizing group attached thereto, an alkyl moiety of the first organic stabilizing group having a longer carbon chain length than an alkyl moiety of the second organic stabilizing group, the first organic stabilizing group being selected from the group consisting of decylamine, undecylamine, dodecylamine, tridecylamine, tetradecylamine and mixtures thereof, and the second organic stabilizing group being selected from group consisting of butylamine, pentylamine, hexylamine, heptylamine, octylamine, nonylamine, decylamine and mixtures thereof,
wherein the metal nanoparticle ink composition is a pneumatic aerosol ink.

12. The composition of claim 11, wherein the ink vehicle comprises:
at least one aromatic hydrocarbon solvent, wherein the at least one aromatic hydrocarbon solvent is compatible with the metal nanoparticles; and
at least one aliphatic solvent, wherein the at least one aliphatic solvent is compatible with the metal nanoparticles; and
wherein the ink composition has a viscosity of from about 5 to about 30 centipoise at a temperature of about 20 to about 30° C.

13. The composition of claim 12, wherein the aromatic hydrocarbon solvent is selected from the group consisting of phenylcyclohexane, toluene, mesitylene, m-xylene, ethylbenzene, and combinations thereof.

14. The composition of claim 12, wherein the at least one aliphatic solvent is selected from the group consisting of ethylcyclohexane, methylcyclohexane, terpineol, bicyclohexane, decahydronaphthalene, cyclohexane, and combinations thereof.

15. A method of printing a metal nanoparticle ink composition comprising:
selectively depositing a metal nanoparticle ink composition on a substrate to form a printed ink pattern, the metal nanoparticle ink composition comprising an ink vehicle and a plurality of metal nanoparticles dispersed in the ink vehicle, the metal nanoparticles including both a first organic stabilizing group and a second organic stabilizing group attached thereto, an alkyl moiety of the first organic stabilizing group having a longer carbon chain length than an alkyl moiety of the second organic stabilizing group, the first organic stabilizing group being selected from the group consisting of decylamine, undecylamine, dodecylamine, tridecylamine, tetradecylamine and mixtures thereof, and the second organic stabilizing group is selected from group consisting of butylamine, pentylamine, hexylamine, heptylamine, octylamine, nonylamine, decylamine and mixtures thereof; and heating the printed ink pattern to an annealing temperature and maintaining the annealing temperature for an anneal time sufficient to form a desired conductive metal pattern on the substrate,
wherein the metal nanoparticle ink composition is a pneumatic aerosol ink and further wherein the selectively depositing is carried out using an aerosol printer.

16. The method of claim 15, wherein the annealing temperature ranges from about 40° C. to about 250° C. and the anneal time ranges from about 1 minute to about 10 hours.

17. The method of claim 15, wherein the first organic stabilizing group is dodecylamine.

18. The method of claim 17, wherein the second organic stabilizing group is octylamine.

* * * * *